United States Patent [19]

Nemoto et al.

[11] Patent Number: 4,644,435
[45] Date of Patent: Feb. 17, 1987

[54] MICRO FLOPPY DISC CASSETTE

[75] Inventors: Tsuneo Nemoto, Sendai; Tetsuo Sawa, Tagajo, both of Japan

[73] Assignee: Sony Corporation, Tokyo, Japan

[21] Appl. No.: 508,878

[22] Filed: Jun. 28, 1983

[30] Foreign Application Priority Data

Jul. 1, 1982 [JP] Japan .................. 57-114718

[51] Int. Cl.⁴ ............... G11B 23/03; G11B 5/012
[52] U.S. Cl. .................... 360/133; 206/444
[58] Field of Search ............ 360/97, 99, 133, 135; 206/444, 312; 369/291; 220/346, 326

[56] References Cited

U.S. PATENT DOCUMENTS

| | | | |
|---|---|---|---|
| 3,144,166 | 1/1962 | Cross et al. | 220/60 |
| 3,900,170 | 8/1975 | Serizawa | 242/198 |
| 4,120,012 | 10/1978 | Bowers | 360/133 |
| 4,164,782 | 8/1978 | Stewart | 360/133 |
| 4,192,422 | 3/1980 | Kotyuk | 206/258 |
| 4,360,845 | 11/1982 | Tajima et al. | 360/133 |
| 4,445,157 | 4/1984 | Takahashi | 360/133 |
| 4,470,083 | 9/1984 | Doering et al. | 360/97 |
| 4,546,397 | 10/1985 | Asami et al. | 360/99 |
| 4,581,670 | 4/1986 | Nemoto et al. | 360/133 |

FOREIGN PATENT DOCUMENTS

58-97166  6/1983  Japan .................. 360/137

Primary Examiner—Stuart N. Hecker
Assistant Examiner—Benjamin E. Urcia
Attorney, Agent, or Firm—Hill, Van Santen, Steadman & Simpson

[57] ABSTRACT

An improved disc cassette having a shutter-closeable aperture, wherein the shutter is moved against the force of a confined coil compression spring into an aperture-open condition and is there latched by a transversely deflectable latch pawl normally biased into latching position and operable by manual pinching of the cassette to release the pawl to permit the spring to return the shutter to the aperture-closed position.

6 Claims, 25 Drawing Figures

MICRO FLOPPY DISC CASSETTE

This invention relates to a recording and/or reproducing disc cassette for processing various kinds of analog and digital signals, and more particularly to a recording and/or reproducing disc cassette comprising a cassette case having upper and lower halves and in which at least one of the upper and lower halves is provided with a head insertion hole, a disc type recording medium such as a magnetic disc and the like constituted by a magnetic sheet rotatably packed within the cassette case, and a shutter movably mounted on the cassette case for opening and closing the head insertion hole.

According to the aforesaid recording and/or reproducing disc cassette, the intrusion of dust and the foreign substances into the cassette from the head insertion hole is prevented since the head insertion hole, when not in use, can be kept closed by means of the shutter. Accordingly, it will be understood that any harmful effect on the recording and/or reproducing operation due to unintentional sticking of foreign substances to the surface of said disc type recording medium can be avoided.

In a conventional disc cassette of this type, the shutter was locked by snapping a cone-shaped detent projection, or boss formed on the cassette into an engagement hole disposed on the shutter, when the shutter is moved up to a position where the head insertion hole is open. In that case, the unlocking of the engagement hole from the cone-shaped projection was achieved by manually moving the shutter from the open position to the closed position, and thereafter the shutter was similarly locked at the closed position by use of other engagement hole and cone-shaped detent projection. In use, the cassette was loaded into the recording and/or reproducing apparatus after the shutter was moved into the open position and locked therein. When the cassette was removed from the recording and/or reproducing apparatus the shutter similarly had to be manually moved into, and locked at the closed position.

In such a conventional structure there was a further disadvantage that the cone-shaped projection boss disposed on the cassette is gradually scraped off by the edge of the engagement hole in the shutter during the course of frequent reciprocation of the shutter thereby rendering the locking action inoperative.

It is therefore an object of the present invention to provide a recording and/or reproducing disc cassette without the abovementioned conventional drawbacks.

Another object of the present invention is to provide a recording and/or reproducing disc cassette having a highly reliable locking structure capable of locking the shutter without fail in spite of extended use over long periods of time, and also having an excellent controllability under which the shutter can be nimbly moved from the open position to the closed position through single finger motion.

According to the present invention, the latching or holding shutter in the open position is overcome by directly disengaging a locking projection or pawl disposed on a portion of either half of the upper and lower cassette halves from the engagement portion of the shutter by pinching the upper and lower halves toward each other and thereby deflecting the locking pawl away from the path of the engagement portion. Upon depression of the latch projection, the shutter is automatically moved to the closed position by means of a spring. Thus, the wear and tear of the locking pawl by the edge of the engagement hole during reciprocation of the shutter is substantially prevented, making possible a highly reliable locking structure capable of surely locking the shutter over a long period of time. In addition, since the shutter can be moved from the open position to the closed position through single finger motion, that is, by pinching the upper and lower halves from the both sides, excellent controllability can be obtained.

Another feature of the present invention lies in the use of a compression coiled spring as spring for moving the shutter from the open position to the closed position, a guide rod in the compression coiled spring to guide it, and an engagement piece disposed inside the shutter to engage the compression coiled spring. Such a construction permits easy assembly of the compression coiled spring and the shutter and improves its mass production.

Still another important feature of the present invention is a structure preventing the shutter from releasing when an attempt is made to force the shutter to move to the closed position, which would tend to cause the locking pawl to bend with its root serving as a fulcrum, and which could result in unlocking of the shutter. A lock pawl restriction boss is provided on the other half side of the upper and lower halves for restricting the deflection of the pawl. The lock pawl and the restriction boss come into contact with each other when the shutter is forced to close. Accordingly, according to the present invention, there is provided a very strong structure such that not only undesirable movement of the shutter from the open position to the closed position is surely prevented, but also damage or wear and tear of the locking pawl by the edge of the engagement hole in the shutter is obviated.

DESCRIPTION OF THE PREFERRED EMBODIMENTS

Figure 1:
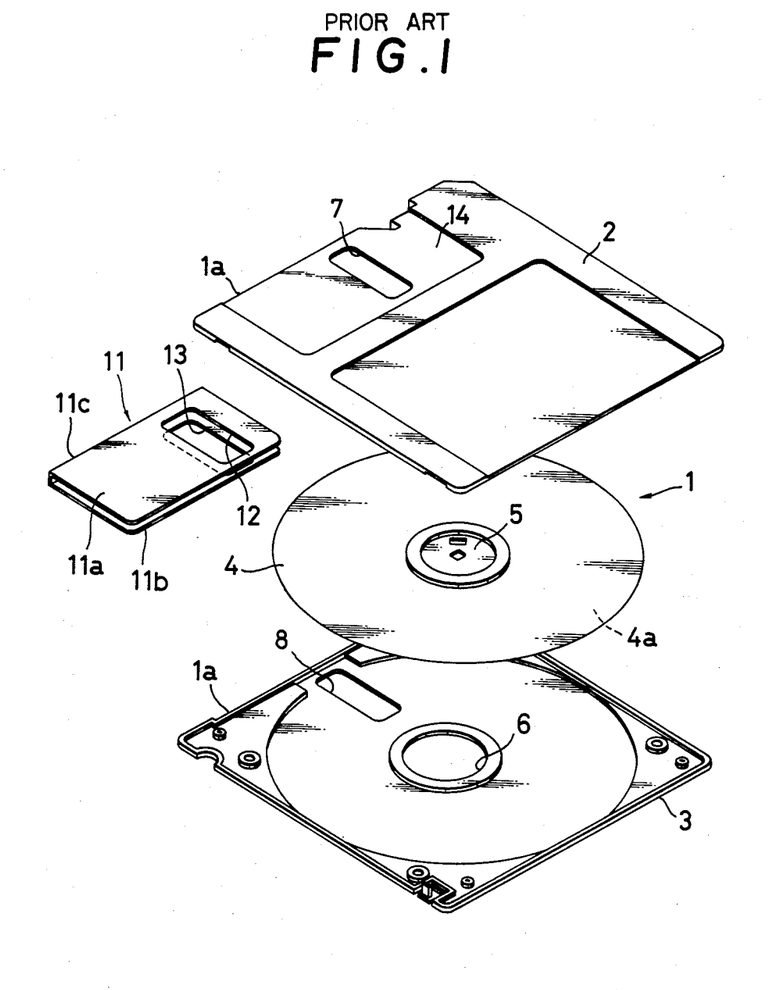
FIG. 1 is an exploded, isometric, view illustrating the principal components of a disc cassette.
Figure 2:
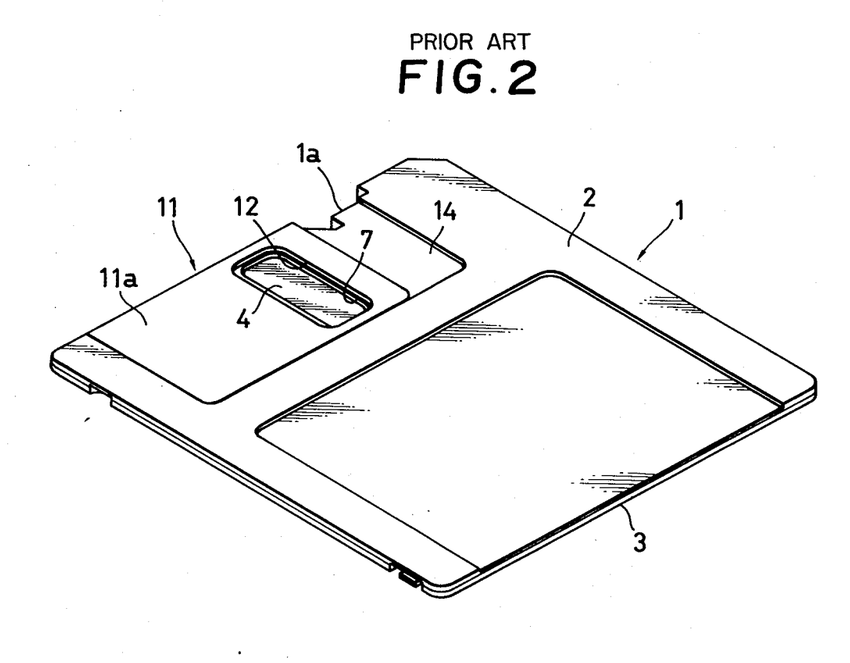
FIG. 2 is an isometric view of the components shown in FIG. 1 shown in their assembled state.

As shown in FIGS. 1 and 2, the disc cassette or jacket 1 includes an upper casing or shell 2, and a lower casing or shell 3, which are secured together conventionally by cement, high frequency welding, or the like, with the magnetic disc 4 positioned therebetween. The lower shell is provided with a center opening 6 through which the disc 4 is driven by way of a driving drum or centerplate 5.

The magnetic layer 4a on both sides of the disc is accessed by the head opening 7 in the upper shell 2 and the opening 8 in the lower shell 3. The shutter recess 1a along the end of the casing adjacent the apertures 7, 8, provides a recess 14 accommodating the shutter 11. The shutter 11 is formed in the shape of a U having an upper surface 11a, a lower surface 11b, and a connecting bight 11c. Apertures 12 and 13 overlie and cooperate, respectively with the apertures 7 and 8 in the upper and lower shells. As shown in FIG. 2, in its assembled state, with the shutter 11 in the aperture-open condition, the magnetic surface of the disc 4 is visible and accessible to a magnetic recording head.

Figure 3A:
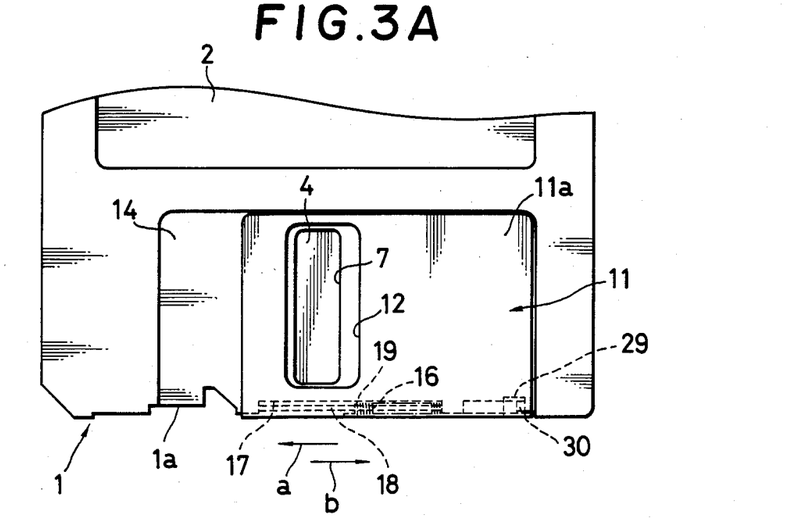
FIG. 3A is a plan view of the shutter-end portion of the cassette with the shutter latched in the open condition.
Figure 3B:
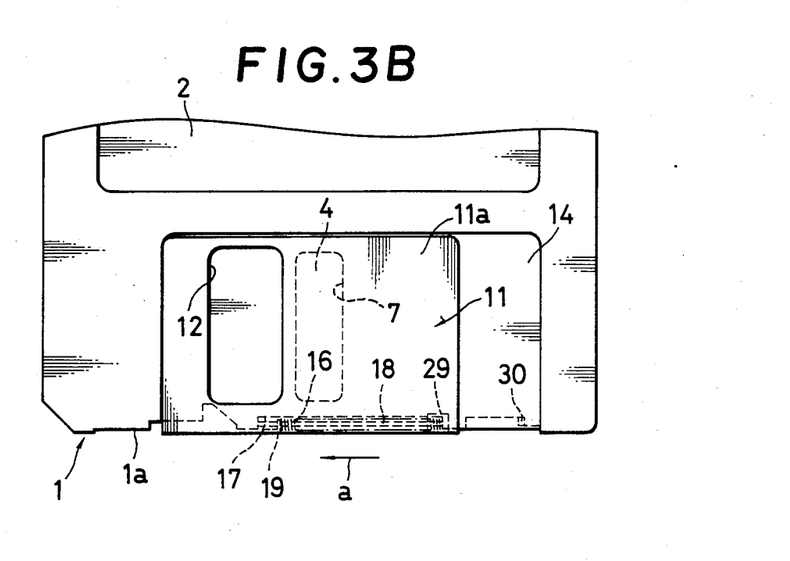
FIG. 3B is a plan view, as in FIG. 3A, with the shutter in the closed position.
Figure 4:
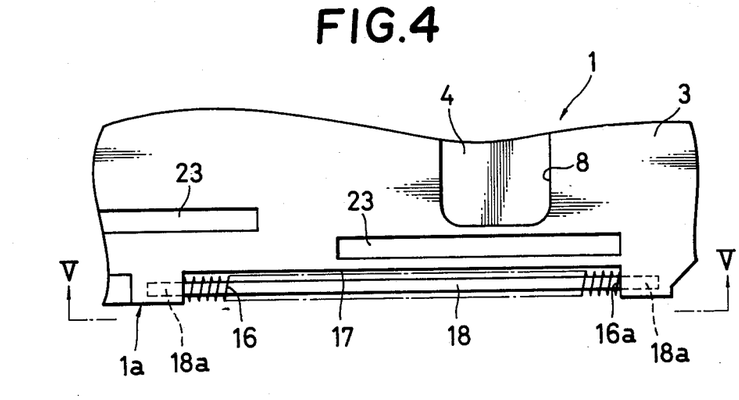
FIG. 4 is an enlarged, partial, plan view of the lower casing of the cassette disclosing the compression spring relationships.
Figure 5:
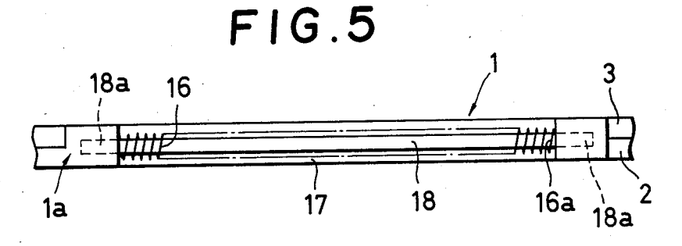
FIG. 5 is an end-elevational view taken along the line V—V of FIG. 4.
Figure 6:
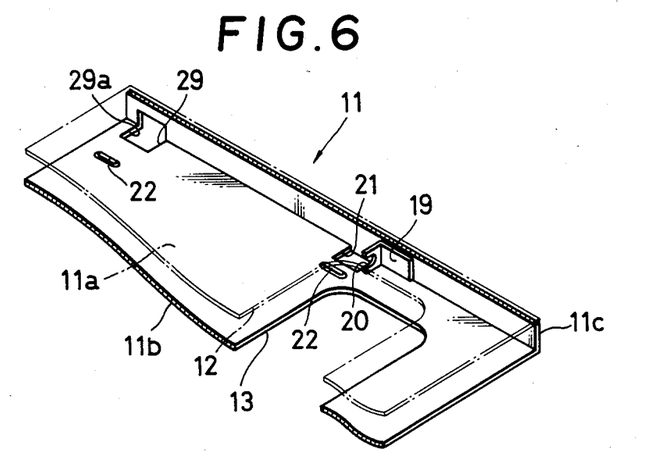
FIG. 6 is a partial isometric view of the shutter employed in accordance with the present invention.

The shutter 11 is spring-biased in the closed condition by means of a compression spring 16 positioned and carried by the shaft 18 as can be seen in FIGS. 3A, 3B, 4 and 5. As there shown, the edge 1a of the upper and lower shells is recessed at 17 to accommodate the coil spring 16. The ends 18a of the shaft 18 are, as shown especially in FIGS. 4 and 5, embedded in the upper and lower shells. The stop abutment 19 is secured to the inside of the bight surface 11c and, as shown in FIGS. 3A and 3B, it reacts against the end of the spring 16 to compress the spring as shown in FIG. 3A, or be returned by the spring into the shutter closed condition as shown in FIG. 3B.

Figure 7A:
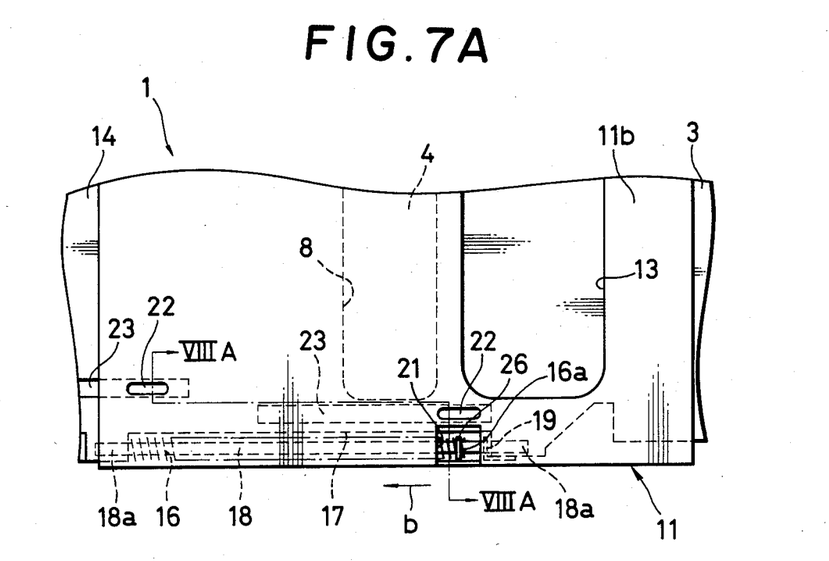
FIG. 7A is a plan view, as in FIG. 3B, illustrating the manner of assembly.
Figure 7B:
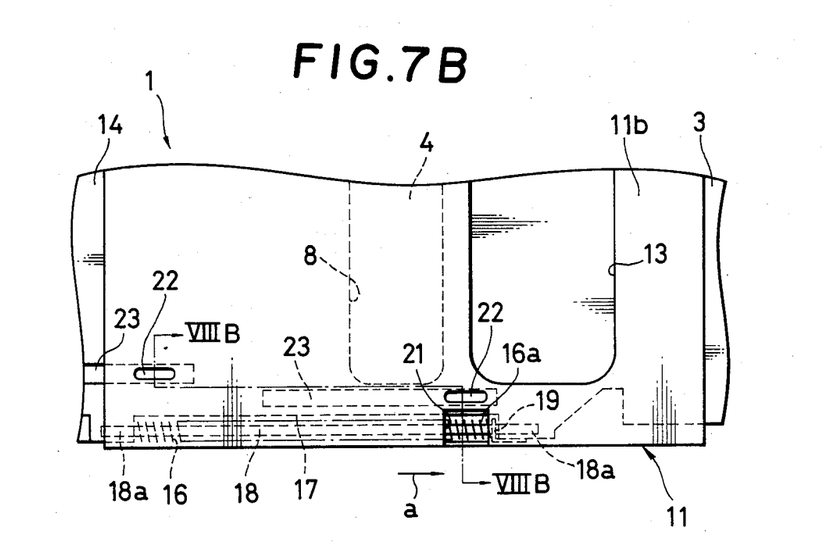
FIG. 7B is a plan view, as in FIG. 7A, showing the shutter in its assembled state.
Figure 8A:
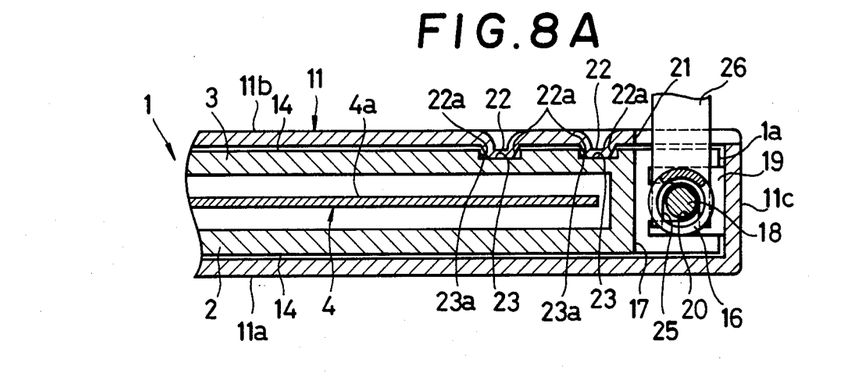
FIG. 8A is a partial side-elevational view taken along the line VIIIA—VIIIA.
Figure 8B:
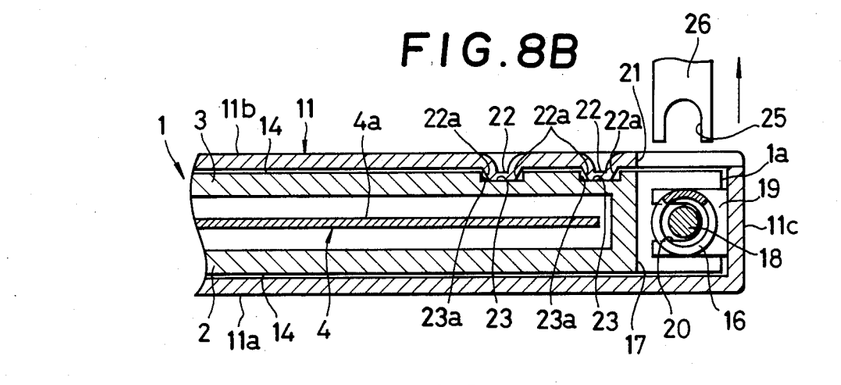
FIG. 8B is a side-elevational view as in FIG. 8A showing tool repositioning.
Figure 8C:
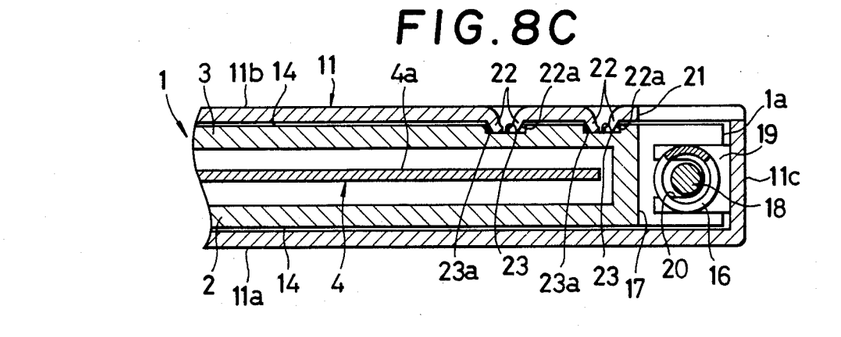
FIG. 8C is a side-elevational view taken along the line VIIIB—VIIIB.

In assembly, the shutter is positioned as shown in FIG. 7A. A tool 26 is inserted through the opening 21 to force the right-hand end of the coil spring 16 toward the left. At this point the shutter may be moved toward the edge into its final position and the tool released permitting the spring to shoulder against the abutment 19 in the assembled mode shown in FIG. 7B. The shutter is retained on the casing by way of the detents 22 on the shutter which cooperate with guide grooves 23 in the casing shell. The detents 22 are clearly illustrated in FIGS. 8A, 8B and 8C where they are shown as comprising dimples in the sheet metal of the shutter. As there shown, the dimples comprise projections 22a which extend into the guide grooves 23 and cooperate with the edges 23a of the guide grooves to limit the motion of the shutter into back and forth, confined, motion. As a result of the arrangement above described, the shutter is resiliently maintained closed but is permitted to reciprocate into the open condition against the bias of the spring 16.

Figure 9A:
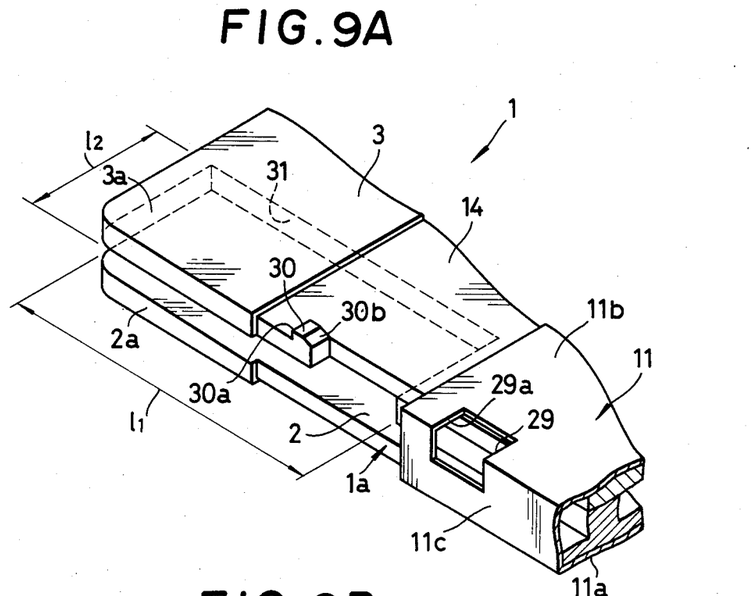
FIG. 9A is an isometric, partial, view of the shutter latch system of the present invention in the shutter closed, unlatched, condition.
Figure 9B:
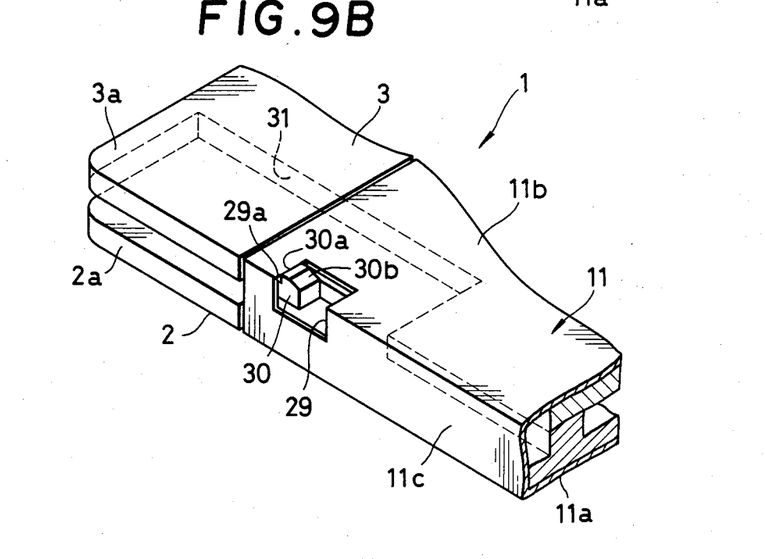
FIG. 9B is an isometric view as in FIG. 9A with the shutter in latched condition.
Figure 10A:
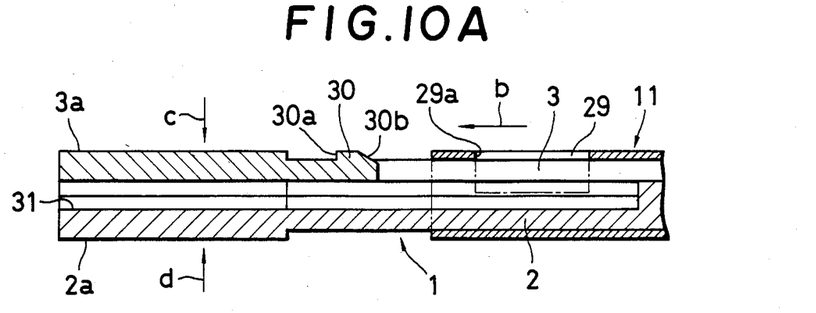
FIG. 10A is an end-elevational view of the cassette latch system as shown in FIG. 9A.
Figure 10B:
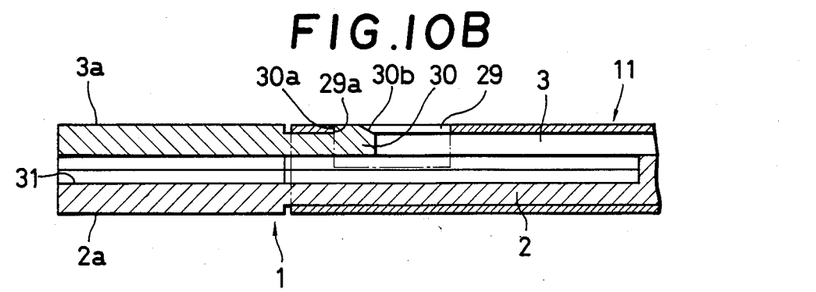
FIG. 10B is an end-elevational view of the latch system shown in FIG. 9B.
Figure 10C:
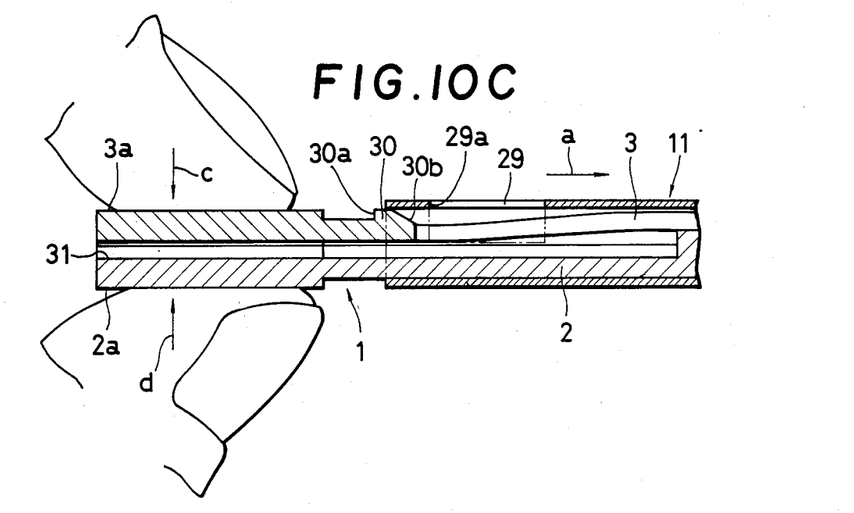
FIG. 10C is an end-elevational view showing the operational technique of unlatching.

In accordance with the present invention, the shutter may be retained against the pressure of the spring 16, in the aperture-open condition by way of a number of illustrated embodiments. As shown in FIGS. 9A, 9B, 10A, 10B, and 10C, a first embodiment provides a locking or latching projection 30 carried by the lower shell 3 (shown on the upper side in the figures mentioned). The projection 30 has a locking side or edge surface 30a which cooperates with an abutment surface 29a of the engagement hole 29 in the shutter 11. A space 31 is provided between the shells 2 and 3 providing a slit having a length $l_1$ and a depth $l_2$ as shown in FIG. 9A. The shells 2 and 3 may be constructed of plastic or metal having a deflectable characteristic so that the shell may be pinched, as illustrated in FIG. 10C to deflect the locking projection 30 downwardly as viewed in FIGS. 9A and 9B. When the shutter 11 is moved toward the left as viewed in these Figures toward the aperture-open condition, the cam surface 30b causes deflection of the shell 3 downwardly to permit passage of the shutter 11 thereover, to a position shown in FIG. 9B in which the latch 30 springs upwardly into contact with the surface 29a. In this condition the shutter is locked or latched in the aperture-open condition. This action is more clearly shown in FIGS. 10A and 10B. When it is desired that the shutter be returned to the aperture-closed condition, the corners 2a, 3a, of the shells are pinched as illustrated in FIG. 10C in the directions c-d, deflecting the shell and thereby moving the projection 30 away from contact with the shutter surface 29a. At this point, the compression spring automatically forces the shutter into the aperture-closed state.

Figure 11:
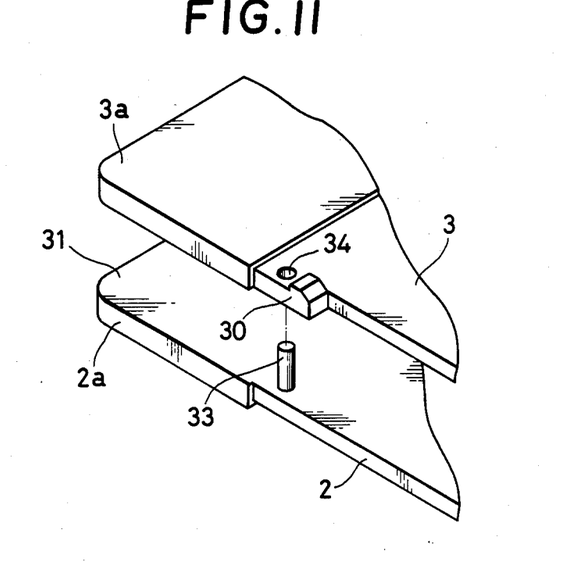
FIG. 11 is an isometric partial view of a modified form of latch system.
Figure 12A:
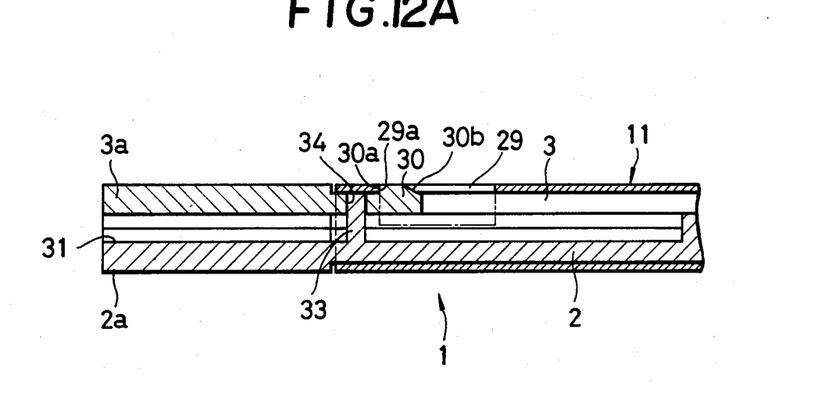
FIG. 12A is an end-elevational view of the latch system shown in FIG. 11.
Figure 12B:
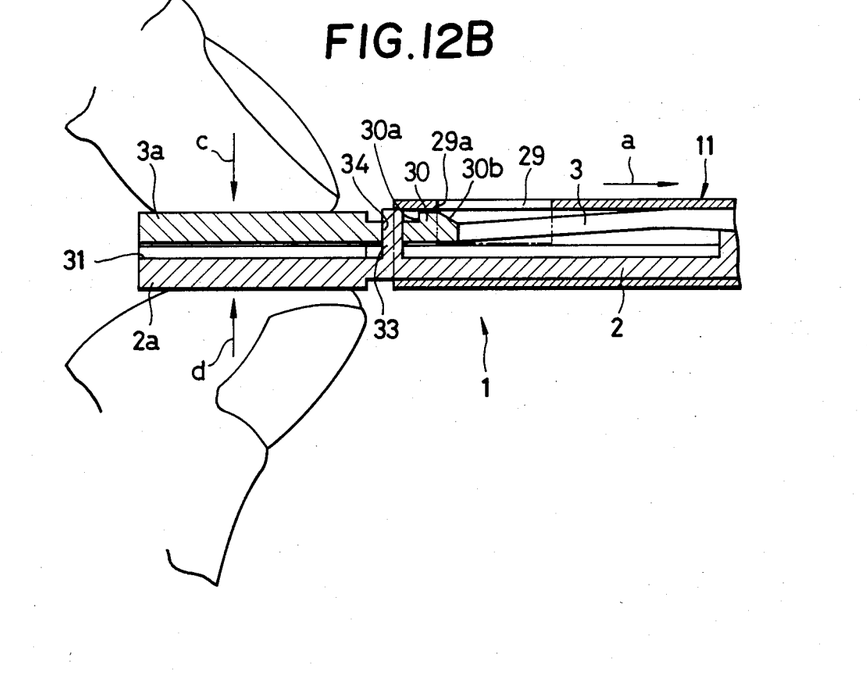
FIG. 12B is an end-elevational view showing the manner of operation of the latch embodiment shown in FIG. 11.
Figure 13:
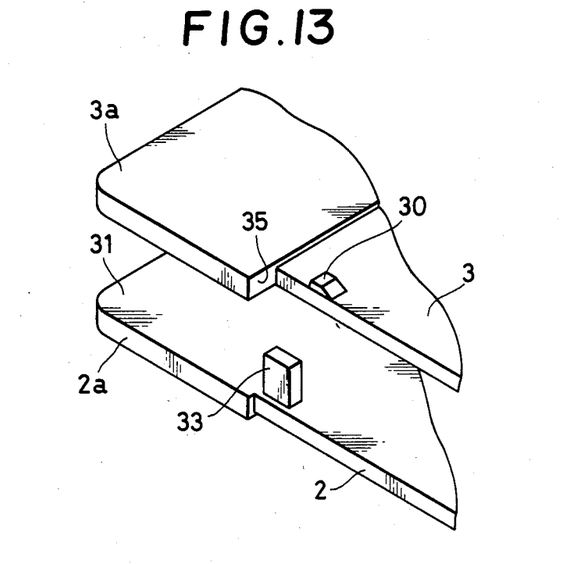
FIG. 13 is an isometric partial view of a further embodiment of a latch system constructed in accordance with the present invention.
Figure 14A:
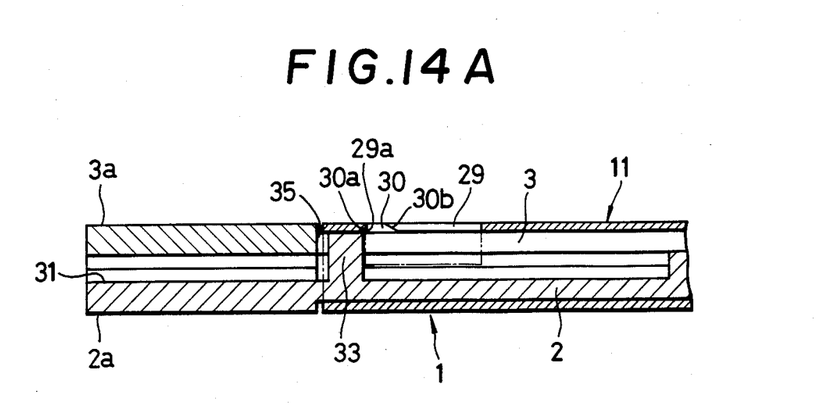
FIG. 14A is an end-elevational view of the latch shown in FIG. 13.
Figure 14B:
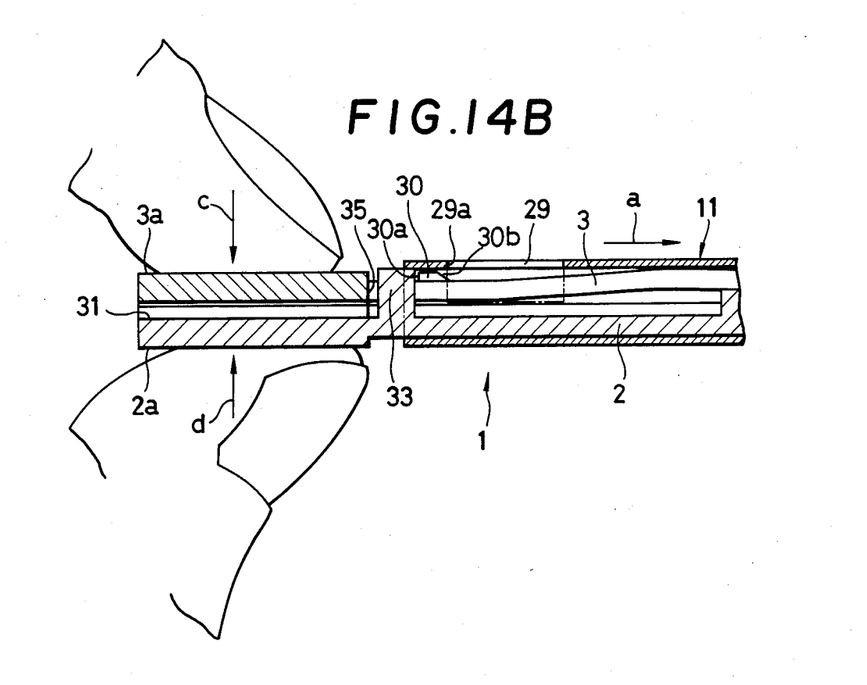
FIG. 14B is an end-elevational view showing the manner of operation of the latch shown in FIG. 13.

A second embodiment of latching device is shown in FIGS. 11, 12A, 12B. As is there shown, a pin 33 is provided on the shell 2 and cooperates with an aperture 34 in shell 3. As may be seen from FIGS. 12A and 12B, the pin 33 aids in the release of the latch 30 by acting upwardly against the shutter 11 while the latch 30 is pushed downwardly by the corner 3a of the shell 3. This provides a positive disengagement which assures a smooth disengagement of the shutter latch. A similar arrangement is shown in FIGS. 13, 14A, and 14B. There, the shell 3 is recessed at 35 to permit passage of a rectangular pin or stop 33a. The rectangular pin 33a cooperates with the shutter identically as the cylindrical pin 33, as may clearly be seen from a consideration of FIGS. 14A and 14B.

Figure 15A:
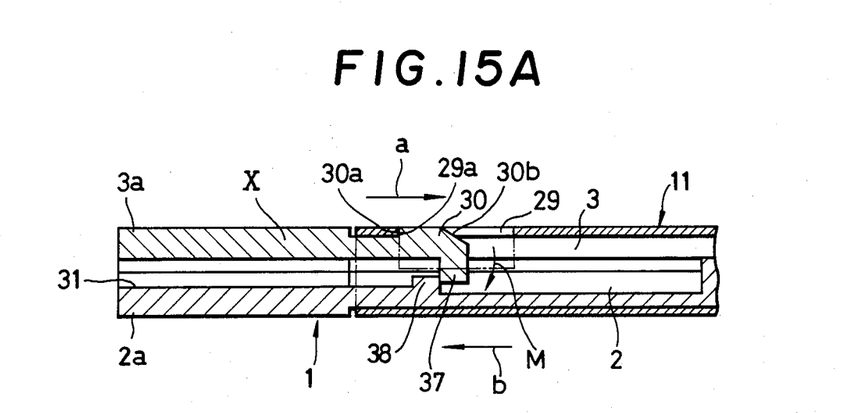
FIG. 15A is an end-elevational view of still a further modified form of latch constructed in accordance with the present invention.
Figure 15B:
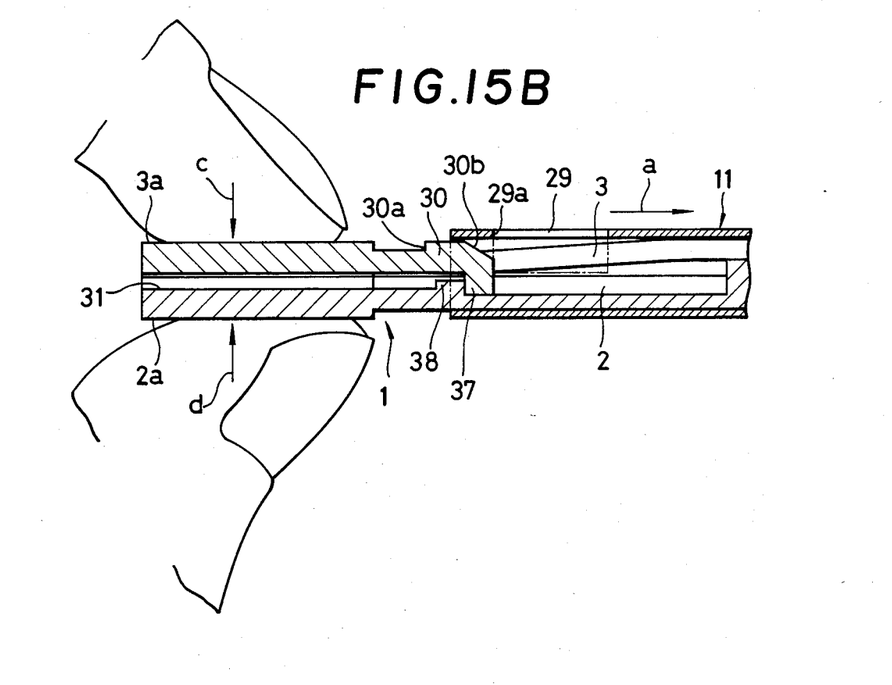
FIG. 15B is an end-elevational view of the latch as shown in FIG. 15A illustrating the manner of operation thereof.

In the use of cassettes of the type above described, it has been found common to have users pull on the shutter toward the right, as indicated with arrow a in 15a. When such a pulling action is attempted, there is a tendency to cause the stop surface 30a to deflect toward the right and downwardly under the influence of the surface 29a of the shutter. In practice, repeated such deflections will permit shaving the projection 30a off the shell 3 rendering the stop unreliable in operation. In the embodiment shown in FIGS. 15A and 15B, a stop projection 37 is integral with the shell 3 and extends downwardly into a transversely sliding cooperation with a stop projection 38. As can be seen, it is not possible for the surface 30 to deflect in a curved manner as a result of any forces applied at 30a, 29a. Instead, the only possible motion of the stops 37 and 38 is in a transverse sliding manner, which can only be accomplished by pinching as shown in 15B. Accordingly, the latching surfaces are maintained in a square condition at all times.

As will be understood from the above description, applicants have provided a simple, yet highly effective shutter control system which is easy to assemble and substantially impervious to wear of the latching surfaces as a result of abuse of the cassette. While we have shown several embodiments that are satisfactory, it will be apparent to those skilled in the art that further variations may be made without departing from the novel concepts of the present invention. Accordingly, it is our intent that the scope of the invention be limited solely by that of hereinafter appended claims.

We claim as our invention:

1. A recording and/or reproducing disc cassette comprising:
   a cassette case having upper and lower halves, at least one of said upper and lower halves being provided with a recording head insertion hole,
   a disc type recording medium rotatably contained within said cassette case,
   a shutter movably mounted on said cassette case for opening and closing said head insertion hole, characterized by:
   a spring for biasing said shutter from a position wherein said head insertion hole is open to position wherein it is closed by said shutter,
   an engagement abutment portion disposed on said shutter; and a locking pawl disposed on one of said upper and lower halves and dapted to engage and latch said abutment portion when said shutter is moved to said open position;
   said one half with said pawl having resiliency;
   said locking pawl being transversely disengaged from said abutment portion when said upper and lower halves are pinched toward each other against said resiliency whereby said shutter is moved from said locked open position to said closed position by means of said spring.

2. A recording and/or reproducing disc cassette comprising:
   a cassette case having upper and lower halves, at least one of said upper and lower halves being provided with a magnetic head insertion hole,
   a disc type recording medium rotatably contained within said cassette case,
   a shutter movably mounted on said cassette case for opening and closing said head insertion hole, characterized by:
   a spring for biasing said shutter from a position wherein said head insertion hole is open to a position wherein it is closed,
   an engagement portion disposed on said shutter; a locking pawl disposed on one of said upper and lower halves and adapted to latch said engagement portion when said shutter is moved to said open position,
   at least said one half with the locking pawl having resiliency, and
   a positive lock-releasing boss disposed on the other one of said upper and lower halves at the vicinity of said engagement portion of said shutter when it has been moved to said open position;
   whereby, when said upper and lower halves are pinched toward each other against said resiliency, the boss moves relatively upward from the inside to transversely separate said locking pawl from the path of said engagement portion and said shutter is thereby released from said open position and is moved to said closed position by means of said spring 54.

3. A recording and/or reproducing disc cassette comprising:
   a cassette case having upper and lower halves, at least one of said upper and lower halves being provided with a head insertion hole,
   a disc type recording medium rotatably contained within said cassette case;
   a shutter movably mounted on said cassette case for opening and closing said head insertion hole, characterized by:
   a compression coiled spring for biasing said shutter from a position where said head insertion hole is open to a position wherein it is closed;
   an engagement portion disposed on said shutter; a locking pawl disposed on one of said upper and lower halves and adapted to resiliently deflect into engagement with said engagement portion when said shutter is moved to said open position;
   said upper and lower halves being resiliently movable toward each other to move said pawl out of locking contact with the shutter engagement portion when said halves are pinched together,
   a reaction element fixed inside said shutter adapted to be engaged with a portion of said compression coiled spring; a reaction element on said case cooperating with another portion of said spring; and said shutter cooperating with said case to provide confining means maintaining said coiled spring in generally elongated condition, whereby moving said shutter from closed to open condition compresses said spring between said reaction elements.

4. A recording and/or reproducing disc cassette comprising:
   a cassette case having upper and lower halves, at least one of said upper and lower halves being provided with a head insertion hole,
   a disc recording medium rotatably mounted within said cassette case; a shutter movably mounted on said cassette case for opening and closing said head insertion hole, characterized by:
   a spring for biasing said shutter from a position where said head insertion hole is open to a position where it is closed;
   an engagement portion disposed on said shutter;
   a locking pawl disposed on either one of said upper and lower halves and adapted to transversely engage and latch said engagement portion when said shutter is moved to said open position; and
   at least the said one-half with said pawl having resiliency, a restriction boss diposed on the other one of said upper and lower halves for preventing said pawl from bending toward the other one of said upper and lowr halves about the root side thereof as a fulcrum;

whereby said locking pawl is disengaged from said engagement portion when said upper and lower halves are pinched toward each other against said resiliency, and said shutter is thereby unlocked at said open position and then moved to said closed position by means of said spring; and whereby said locking pawl is to be bent toward the other one of said upper and lower halves with said root side thereof as a fulcrum due to application of a forcible movement of said shutter toward said closed position side and longitudinally against said pawl, the bending of said locking pawl is prevented by interception by said restriction boss.

5. A recording and/or reproducing disc cassette comprising:

a cassette case having upper and lower halves, at least one of said upper and lower halves being provided with a recording head insertion hole, a disc type recording medium rotatably contained within said cassette case, a shutter movably mounted on said cassette case for opening and closing said head insertion hole, characterized by:

a spring for biasing said shutter from a position wherein said head insertion hole is open to a position wherein it is closed by said shutter, a first latching portion disposed on said shutter; and a cooperating second latching portion disposed on one of said upper and lower halves and adapted to engage and latch with said latching portion when said shutter is moved to said open position;

said one half with said second latching portion having resiliency;

said second latching portion being transversely disengaged from said first latching portion when said upper and lower halves are pinched toward each other against said resiliency whereby said shutter is moved from said locked-open position to said closed position by means of said spring.

6. The apparatus set forth in claim 5 wherein one of said latching portions includes a sloping ramp permitting movement of said shutter to said open position readily and without otherwise pinching said casing.

* * * * *